(12) United States Patent
Gonze et al.

(10) Patent No.: US 8,756,505 B2
(45) Date of Patent: Jun. 17, 2014

(54) BROWSER INTERPRETABLE DOCUMENT FOR CONTROLLING A PLURALITY OF MEDIA PLAYERS AND SYSTEMS AND METHODS RELATED THERETO

(75) Inventors: Lucas Gonze, Venice, CA (US); Carl Sobeski, Clarks Summit, PA (US)

(73) Assignee: Yahoo! Inc., Sunnyvale, CA (US)

(*) Notice: Subject to any disclaimer, the term of this patent is extended or adjusted under 35 U.S.C. 154(b) by 209 days.

(21) Appl. No.: 12/142,994

(22) Filed: Jun. 20, 2008

(65) Prior Publication Data

US 2009/0006963 A1    Jan. 1, 2009

Related U.S. Application Data

(63) Continuation of application No. 11/688,657, filed on Mar. 20, 2007.

(51) Int. Cl.
*G06F 3/00* (2006.01)

(52) U.S. Cl.
USPC ............ 715/721; 715/716; 715/744; 715/760

(58) Field of Classification Search
USPC ......... 715/201, 210, 234, 716–728, 739, 760, 715/744–747; 725/51, 109, 113; 348/E7.701; 709/231; 4/201, 210, 234, 4/716–728, 739, 746, 760
See application file for complete search history.

(56) References Cited

U.S. PATENT DOCUMENTS 6,498,897 B1 * 12/2002 Nelson et al. ................. 386/243
6,654,765 B2 * 11/2003 Wong et al. ........................ 1/1
6,882,793 B1 * 4/2005 Fu et al. ......................... 386/241
6,904,566 B2 * 6/2005 Feller et al. .................... 715/728
7,219,308 B2 * 5/2007 Novak et al. ................... 715/768
2002/0091762 A1 * 7/2002 Sohn et al. ..................... 709/203
2002/0104096 A1 * 8/2002 Cramer et al. ................. 725/113

(Continued)

FOREIGN PATENT DOCUMENTS

KR   1020050072071   7/2005
WO   WO 02086709     10/2002

OTHER PUBLICATIONS

Microsoft Windows 2000 Explorer, 1999 Microsoft Corporation, Screenshots 1-9.*

(Continued)

*Primary Examiner* — Omar Abdul-Ali
*Assistant Examiner* — Andrew Tank
(74) *Attorney, Agent, or Firm* — James J. DeCarlo; Greenberg Traurig, LLP

(57) ABSTRACT

A browser interpretable document comprising a first media file or a pointer to the first media file; a graphical user interface definition, or a pointer to the graphical user interface definition, the graphical user interface definition comprising a first user interface element and a function associated with the first user interface element; and, a set of commands, or a pointer to the set of commands, for controlling the operation of a plurality of media players; wherein, when the browser interpretable document is rendered by a conventional web browser, the web browser can render a graphical user interface based on the graphical user interface definition, and wherein the rendered graphical user interface controls one of the plurality of media players to facilitate playing of the first media file.

14 Claims, 16 Drawing Sheets

(56) References Cited

U.S. PATENT DOCUMENTS

| | | | |
|---|---|---|---|
| 2002/0122060 A1* | 9/2002 | Markel | 345/760 |
| 2002/0161797 A1 | 10/2002 | Gallo et al. | |
| 2003/0076345 A1 | 4/2003 | Feller et al. | |
| 2004/0261040 A1 | 12/2004 | Radcliffe et al. | |
| 2006/0212442 A1* | 9/2006 | Conrad et al. | 707/5 |
| 2006/0259588 A1* | 11/2006 | Lerman et al. | 709/219 |
| 2008/0005348 A1* | 1/2008 | Kosiba et al. | 709/231 |
| 2008/0288536 A1* | 11/2008 | Pfeiffer et al. | 707/104.1 |

OTHER PUBLICATIONS

Myers, "mySoundTrack: A Commonsense Playlist Generator", MIT Media Lab, copyright MIT 2006.*

Li et al., "Characteristics of Streaming Media Stored on the Web", Journal ACM Transactions on Internet Techonology, vol. 5 Issue 4, Nov. 2005, copyright ACM 2005.*

International Search Report (PCTUS2008/056878) dated Aug. 7, 2008.

* cited by examiner

```
<!DOCTYPE html PUBLIC "-//W3C//DTD XHTML 1.0 Strict//EN" "http://www.w3.org/TR/xhtml1/DTD/xhtml1-strict.dtd">
<!-- saved from url=(0014)about:internet -->
<html xmlns="http://www.w3.org/1999/xhtml">
<head>
    <title>
        YMU Playlist Demo
    </title>
</head>
<body onselectstart="return false">
    <h1>YMU Playlist Demo</h1>
    <p>
        <a href="mms://mms.content.loudeye.com/600141/p/068/58/80/0685880_0108_00_0690.wma" class="htrack" title="10,000 Years" type="audio/ms-wma"
    tabindex="1">
            <img alt="10,000 Years" src="http://www.artistdirect.com/Images/Sources/AMGCOVERS/music/cover200/drg200/g223/g22312crhvi.jpg"/>
            10,000 Years - Honeydogs
        </a>
    </p>
    <p>
        <a href="http://music.yahoo.com/track/24440930" class="htrack" title="Got My Own Thing" tabindex="2">
            <img alt="Somebody's Miracle" src="http://us.ent1.yimg.com/images.launch.yahoo.com/000/029/420/29420665.jpg"/>
            Got My Own Thing - Liz Phair
        </a>
    </p>
    <p>
        <a href="http://music.yahoo.com/track/31683488" class="htrack" title="And Your Bird Can Sing" tabindex="3">
            <img alt="Under The Covers, Vol. 1" src="http://us.ent1.yimg.com/images.launch.yahoo.com/000/033/839/33839973.jpg"/>
            And Your Bird Can Sing - Matthew Sweet & Susanna Hoffs
        </a>
    </p>
    <p>
        <a href="http://music.yahoo.com/track/16472906" class="htrack" title="Monkey to Man" tabindex="4">
            <img alt="The Delivery Man" src="http://us.ent1.yimg.com/images.launch.yahoo.com/000/019/773/19773651.jpg"/>
            Monkey to Man - Elvis Costello
        </a>
    </p>
    <script type="text/javascript" src="http://server.yahoo.com/user/file.js"></script>
</body>
</html>
```

Figure 13

```
<!DOCTYPE html PUBLIC "-//W3C//DTD XHTML 1.0 Strict//EN" "http://www.w3.org/TR/xhtml1/DTD/xhtml1-
strict.dtd">
<!-- saved from url=(0014)about:internet -->
<html xmlns="http://www.w3.org/1999/xhtml">
    <head>
        <title>Playlist: savedplaylist</title>
    </head>
    <body onselectstart="return false">
        <h1>Playlist: savedplaylist</h1>
            <p>
            <a href="http://music.yahoo.com/track/31683488" class="htrack" title="And Your Bird Can Sing"
type="audio/ms-wma" tabindex="1">
            <img alt="Under The Covers, Vol. 1"
src="http://us.ent1.yimg.com/images.launch.yahoo.com/000/033/840/33840132.jpg"/>
            And Your Bird Can Sing - Matthew Sweet<p>

<a href="http://music.yahoo.com/track/24440930" class="htrack" title="Got My Own Thing"
type="audio/ms-wma" tabindex="2">
            <img alt="Somebody's Miracle"
src="http://us.ent1.yimg.com/images.launch.yahoo.com/000/029/420/29420728.jpg"/>
            Got My Own Thing - Liz Phair<p>

<a href="http://music.yahoo.com/track/16472906" class="htrack" title="Monkey To Man" type="audio/ms-
wma" tabindex="3">
            <img alt="The Delivery Man"
src="http://us.ent1.yimg.com/images.launch.yahoo.com/000/019/773/19773649.jpg"/>
            Monkey To Man - Elvis Costello<p>

<a href="http://music.yahoo.com/track/2127672" class="htrack" title="Breathe (2 AM) (Radio Version)"
type="audio/ms-wma" tabindex="4">
            <img alt="Breathe (2 AM)"
src="http://us.ent1.yimg.com/images.launch.yahoo.com/000/017/376/17376755.jpg"/>
            Breathe (2 AM) (Radio Version) - Anna Nalick<p>

<script type="text/javascript" src="http://server.yahoo.com/user/file.js"></script>
    </body>
</html>
```

Figure 14

```
<!DOCTYPE html PUBLIC "-//W3C//DTD XHTML 1.0 Strict//EN"
"http://www.w3.org/TR/xhtml1/DTD/xhtml1-strict.dtd">
<html xmlns="http://www.w3.org/1999/xhtml">
  <head>
    <title>
      My First Playlist
    </title>
  </head>
  <body>
    <h1>My First Playlist</h1>
    <p>
      <a href="http://example.com/mp3" class="htrack" title="My Sharona"
tabindex="2" type="audio/mpeg">
        <img alt="The Knack album art"
src="http://example.com/img/albumart/the_knack.gif"/>
        don't deny you love this song
      </a>
    </p>

<div class="htrack">
      <img alt="hTrack logo" src="http://example.com/img/albumart/htrack.gif"/>
      <a href="http://example.com/ogg" class="timed" tabindex="3">Hello, hTrack
World! (Ogg Vorbis)
      </a>
      <a href="http://example.com/qt" class="timed" tabindex="4">Hello, hTrack
World! (Quicktime)
      </a>
      <a href="http://example.com/about">Lyrics to this song</a>
    </div>

<p>
      <a href="http://example.com/intro" class="htrack" title="playlist intro"
tabindex="1">
        <img alt="The Knack album art"
src="http://example.com/img/albumart/logo_for_my_show.gif"/>
        this intro MP3 will always play first
      </a>
    </p>

</body>
</html>
```

BROWSER INTERPRETABLE DOCUMENT FOR CONTROLLING A PLURALITY OF MEDIA PLAYERS AND SYSTEMS AND METHODS RELATED THERETO

CROSS REFERENCE TO RELATED APPLICATIONS

This application is a continuation of, and claims the benefit from U.S. patent application Ser. No. 11/688,657, filed Mar. 20, 2007, entitled BROWSER INTERPRETABLE DOCUMENT FOR CONTROLLING A PLURALITY OF MEDIA PLAYERS AND SYSTEMS AND METHODS RELATED THERETO.

This application includes material which is subject to copyright protection. The copyright owner has no objection to the facsimile reproduction by anyone of the patent disclosure, as it appears in the Patent and Trademark Office files or records, but otherwise reserves all copyright rights.

FIELD

The instant disclosure relates to the field of media player software, and more particularly describes a browser interpretable document for controlling a plurality of media players.

BACKGROUND

The advent of Motion Picture Entertainment Group Level 3 ("MP3") digital encoding for audio files has revolutionized the distribution of music by reducing the distribution costs to near zero. This, in turn, has encouraged artists to create new works and to make their works available in digital form. However, the MP3 media type has some disadvantages. For example, digital rights management capabilities are not built into the MP3 media type. As a result, some have sought to design new media types that facilitate digital rights management. Others have created new media types in an effort to improve the techniques used when converting analog sources, such as sound or light, into and/or from a digital format. Still others have created new media types that focus on reducing the amount of data that needs to be transmitted and/or stored to play the content with sufficient accuracy to please at least a majority of users, or for other, specific purposes. This has lead to an explosion of different media types in common use.

The rapid growth in digitally-available content has also spurred the creation of a variety of media players, including both dedicated, stand-alone devices such as, without limitation, the iPod line of personal music players distributed by Apple Computer, Inc. of Cupertino, Calif., the Zune distributed by Microsoft, Inc. of Redmond, Wash., and the Zen line of personal music players distributed by Creative Technology, Ltd. of Singapore, and software-based media players for use on portable computers. To facilitate the user's access to digital content, many media players can play content encoded using a variety of media types. By way of example, the Windows Media Player software distributed by Microsoft, Inc. of Redmond, Wash., can play content encoded using a variety of media types, including Windows Media Audio ("WMA"), Windows Media Video ("WMV"), Motion Picture Entertainment Group ("MPEG"), MP3, WAVE, and Musical Instrument Digital Interface ("MIDI"). Windows Media Player also allows users to add support for new and alternative media types by simply installing an appropriate Coder/Decoder ("CODEC").

Although many media players can play content encoded in any of a variety of media types, certain media types are proprietary, and the right to display content encoded using that media type is frequently tightly controlled. By way of example, the encoding technique employed by Apple Computer Inc.'s Quicktime, and RealNetworks' RealVideo and RealAudio media types are generally proprietary. As a result, users are forced to use a proprietary media player, rather than their preferred media player, if they wish to play content created using such a proprietary media type. This can be a problem both for users attempting to access a variety of media files within their own personal library, and for users attempting to access media files from other libraries. By way of example, some users may share a playlist, or ordered list of content to be played, with other users, and the other users may not realize that their preferred media player will not be able to play all of the content in the playlist.

Some software-based media players permit users to create customized "skins", or user interfaces, for that particular media player. Such skins allow users to more easily access the commands and controls they most frequently use or need.

In addition, each media player typically has its advantages and disadvantages when compared to the other media players available, and users tend to use the player with the features and user interface that is most convenient and/or comfortable for them. As a result, users tend to grow comfortable with a particular media player user interface, especially a customized user interface, and when they are forced to switch from a media player containing such a user interface to one that uses a different interface, such as happens when content is encoded with a proprietary media type, they can become frustrated.

SUMMARY

What is needed is a means for providing a standardized interface through which a plurality of media players can be controlled. Accordingly, the instant disclosure is directed to a browser interpretable document for controlling a plurality of media players that substantially obviates one or more of the problems due to limitations and disadvantages of the related art. The media players described in the instant disclosure may be capable of playing audio, video, and/or other types of content; however, for clarity, the instant disclosure will focus on playing audio content encoded in a variety of media types, some of which may require a specific media player. Such a focus is adopted to clarify the browser interpretable document and its operation with the media players, and should not be read as limiting the browser interpretable document or the user interfaces created thereby to media players for audio content.

Many devices, including, without limitation, personal computers ("PC's"), laptops, personal digital assistants ("PDA's"), cellular telephones, gaming consoles, and portable media players ("PMP's") are now capable of playing content. These devices are also frequently capable of running at least one browser. Browsers are software applications that are capable of interpreting a document stored in Hypertext Markup Language ("HTML"), Extensible Markup Language ("XML") or other such markup language and presenting the document's contents to a user. Browsers also frequently support at least one scripting language, such as, without limitation Visual Basic Script ("VBScript"), distributed by the Microsoft Corporation of Redmond, Wash.; and JavaScript™, distributed by Sun Microsystems. Such scripting languages can add a measure of programmability to the browser, rather than limiting the browser to simply displaying marked-up documents to users.

Some embodiments comprise a method of controlling a plurality of media players using a standardized interface, comprising defining a graphical user interface through which a plurality of media players are to be controlled, wherein the graphical user interface comprises a user interface element to be displayed as part of the graphical user interface; associating at least one function with the defined user interface element; associating at least one playlist with the graphical user interface, wherein the playlist comprises a plurality of entries, and wherein each entry comprises a first media file or a pointer to the first media file; storing the graphical user interface and the association of the playlist with the graphical user interface in a manner interpretable by a web browser; and, associating computer program process code with the graphical user interface, wherein the computer program process code comprises instructions for determining whether a media player capable of playing the first media file is accessible to a computing device; causing the media player determined capable of playing the first media file to be loaded by the computing device, wherein at least controls of the media player are hidden from a user; monitoring for interaction with the defined user interface element; and, controlling the media player via the user interface element so as to cause the media player to function in a manner corresponding to the function associated with the user interface element.

In some embodiments, the graphical user interface may exist independent from any media player, and may comprise one or more graphics files. In some embodiments, the playlist may further comprise a media type indicator associated with the first media file, and the media player capable of playing the first media file may be determined, at least in part, by the media type indicator associated with the first media file. In some embodiments, the graphical user interface and the association of the computer program process code with the graphical user interface may be stored in a manner interpretable by a web browser. In some embodiments, the graphical user interface, the association of the graphical user interface and the playlist, and the association of the graphical user interface and the computer program process code are stored in the same file.

Some embodiments comprise a system for controlling a plurality of media players, comprising a defined graphical user interface, wherein the defined graphical user interface receives user interactions, wherein the defined graphical user interface comprises a user interface element, wherein the defined user interface element has a function associated therewith, and wherein the defined graphical user interface is stored in a markup language derived from the Standardized Generalized Markup Language and interpretable by a web browser running on a computing device; a set of instructions, interpretable by the web browser, whereby the web browser can send commands to one of a plurality of media players installed on the computing device, thereby permitting the web browser to control playback of a media file based on user interactions with the defined graphical user interface; and a playlist, wherein the playlist is stored in a markup language derived from the Standardized Generalized Markup Language and interpretable by the web browser, wherein the playlist comprises a plurality of entries, and wherein at least a subset of the plurality of entries corresponds to a multimedia file.

In some embodiments, the set of instructions may further comprise instructions for determining whether a media player capable of playing a media file is installed on the computing device. In some embodiments, each playlist entry may further comprise at least one media type indicator associated with the playlist entry, wherein the determination of whether a media player capable of playing the media file is installed on the computing device is based, at least in part, on the media type indicator associated with a playlist entry. In some embodiments, the playlist and the graphical user interface are stored using a common markup language, such as, without limitation, the eXtensible Markup Language and/or the Hypertext Markup Language.

Some embodiments comprise a browser interpretable document comprising a playlist comprising a plurality of entries, wherein each entry comprises a first media file or a pointer to the first media file; a graphical user interface definition, or a pointer to the graphical user interface definition, the graphical user interface definition comprising a first user interface element and a function associated with the first user interface element; and, a set of commands, or a pointer to the set of commands, for controlling the operation of a plurality of media players; wherein, when the browser interpretable document is rendered by a conventional web browser, the web browser renders a graphical user interface based on the graphical user interface definition, and wherein the rendered graphical user interface controls one of the plurality of media players to facilitate playing of the first media file.

In some embodiments, the graphical user interface definition may be defined in a standardized markup language derived from the Standardized Generalized Markup Language, such as, without limitation, the Hypertext Markup Language. In some embodiments, the set of commands may comprise instructions in a scripting language. In some embodiments, each playlist entry may further comprise a media type indicator associated with the first media file, and the set of commands comprises instructions through which the browser can determine whether a media player capable of playing the first media file is installed on a computing device on which the browser is running, and wherein such determination is made, at least in part, based on the media type indicator associated with the first media file.

It is to be understood that both the foregoing general description and the following detailed description are exemplary and explanatory and are intended to provide further explanation of the disclosed browser interpretable document. Additional features and advantages of the invention will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

BRIEF DESCRIPTION OF THE DRAWINGS

The accompanying drawings, which are included to provide a further understanding of the disclosed browser interpretable document for controlling a plurality of media players, are incorporated in and constitute a part of this specification, illustrate various embodiments and, together with the description, serve to explain the principles of at least one embodiment of the disclosed browser interpretable document.

In the drawings:

FIG. 13 is an exemplary browser interpretable document written in HTML.

FIG. 14 is an alternative exemplary browser interpretable document written in HTML.

FIG. 15 is an alternative exemplary browser interpretable document written in HTML.

DETAILED DESCRIPTION

Figure 1:
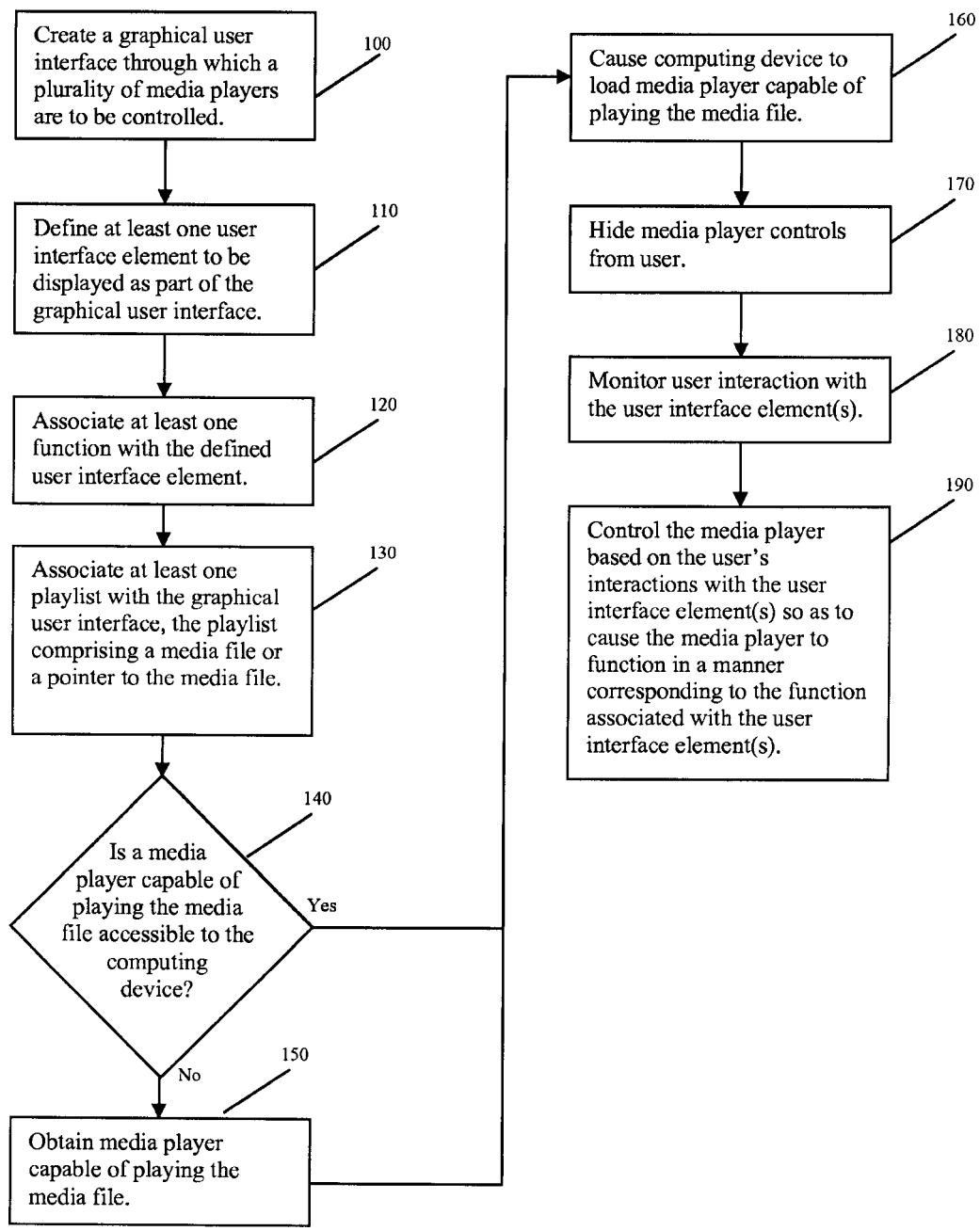
FIG. 1 is a block diagram illustrating an exemplary method through which a browser interpretable document can be used to control a plurality of media players.

Reference will now be made in detail to embodiments of the disclosed browser interpretable document for controlling a plurality of media players, examples of which are illustrated in the accompanying drawings.

In an embodiment, a browser interpretable document is provided comprising a plurality of content entries and a set of instructions for controlling a plurality of media players. In an embodiment, to ensure that the browser interpretable document can be read and interpreted by a wide variety of browsers, the browser interpretable document leverages existing browser interpretable languages such as, without limitation, Hypertext Markup Language ("HTML"), eXtensible Markup Language ("XML"), Cascading Style Sheets ("CSS"), and the like, and deviates from the standardized definitions of such browser interpretable languages as little as possible. By way of example, without limitation, a browser interpretable document embodiment described herein introduces only two new keywords into the traditional browser vocabulary, "hTrack" and "timed", which are both used as class names. Classes are defined in the HTML 4+ specification.

In a traditional markup language, such as HTML, a link, or pointer to content, might be written as <a href="/media/example.mp3">Example Link</a>. When such a link is rendered by a browser, the Uniform Resource Locator ("URL") and related tags will be hidden from the user, and the user will simply see the words Example Link, but because of the browser's interpretation of the markup language, the user can click on or otherwise interact with the words to access the content referenced in the link. When the user interacts with the words, the browser attempts to load the file from the path specified in the URL, the process for which may include creating a local copy of the example.mp3. If the browser does not detect any browser interpretable instructions at or near the beginning of the file, the browser can attempt to determine whether the file is of a type that can be interpreted by any plug-ins or other enhancements to the browser. If the file can be interpreted by a plug-in, the plug-in is loaded by the browser and the file is loaded by the plug-in. If the file is not of a format interpretable by the browser or a plug-in, the browser can pass the file information to the operating system. The operating system then determines an appropriate application, such as a media player, that should be loaded to handle the file based on information from the file. By way of example, without limitation, the operating system may look at the file's extension (i.e. the characters after the right-hand most period in the file name) to determine an appropriate application to be loaded. In the example provided above, since example.mp3 is a media file, the operating system can cause a locally-installed media player to load, and can send instructions to the locally-installed media player to play example.mp3. This behavior can be cumbersome and, as described above, can result in the loading of media players with interfaces with which the user is unfamiliar.

By modifying the link such that the browser recognizes the file as being of a track (i.e. by employing the "hTrack" class), the browser can be instructed to take alternative actions when the user interacts with the link. By way of example, without limitation, by changing the link above to read <a href="/media/example.mp3" class="htrack">mp3 link</a>, the browser can be instructed that example.mp3 is a track, and that it should therefore be handled according to alternative instructions contained in the browser interpretable document or referenced therein.

One or more such tracks can be combined together in a "playlist", or list of content to be played by an appropriate media player. In an embodiment, the order in which the tracks are played can be determined by the order in which the tracks appear within the playlist or other browser interpretable document. By way of example, without limitation, a browser interpretable document comprising the code listed below in Table 1 would cause first.mp3 to play first, followed by second.mp3.

TABLE 1

<a href="/media/first.mp3" class="htrack">first song</a>
<a href="/media/second.mp3" class="htrack">second song</a>

Although the order in which the tracks are listed within the browser interpretable document can be used to determine the play order, in an embodiment this play order can be altered by taking advantage of the tabindex attribute defined in the well-known HTML 4+ and/or XHTML specifications. Thus, by modifying the code listed in Table 1 to that listed below in Table 2, the browser can be instructed to play first.mp3 first, even though it is not the first content listed in the playlist.

TABLE 2

<a href="/media/second.mp3" class="htrack" tabindex="2">second song</a>
<a href="/media/first.mp3" class="htrack" tabindex="1">first song</a>

Although described herein as employing HTML, alternative embodiments, including those employing XML Shareable Playlist Format ("XSPF"), MPEG Audio Layer 3 URL ("M3U"), or Advanced Stream Redirector ("ASX"), are also envisioned. The instant disclosure's use of HTML-style URL's and markup language is intended for clarity, and should not be interpreted as limiting the browser interpretable document and/or the playlists to such a markup language.

Additional attributes can also be utilized to further streamline identifying an appropriate media player for a given media type. By way of example, without limitation, a "type" attribute can be employed. The type attribute can give an advisory hint as to the media type available via the link. Such a hint can allow the browser interpretable document or instructions associated therewith to initiate alternative procedures in the event the media type is not currently supported by the device on which the browser is running. In an embodiment, authors who use such an attribute can take responsibility for managing the risk that the media type specified is inconsistent with the content available via the link.

Another attribute that can be employed is the "title" attribute. In an embodiment, the title attribute can be used in a manner similar to the way in which the //playlist/trackList/track/title attribute is used in an XSPF playlist. That is, the title attribute can provide a hint about the content's title.

Still another attribute that can be employed is the image or "img" attribute. In an embodiment, the image attribute can be used in a manner similar to the //playlist/trackList/track/image attribute in an XSPF playlist. That is, the image attribute can provide a link to album art or other images associated with the content.

Yet another attribute that can be employed is the "free-text" element. In an embodiment, the free-text element can be used in a manner similar to the //playlist/trackList/track/annotation attribute in an XSPF playlist. That is, the free-text element can provide a comment or other information about the content.

When used in combination to create a playlist entry in a browser interpretable document, an exemplary link might resemble that of Table 3, below.

TABLE 3

```
<a href="http://example. com/mp3"
class="htrack"
title="My Sharona" type="audio/mpeg">
<img alt="The Knack album art"
    src="http://example.com/img/albumart/the_knack.gif"/>
don't deny you love this song
</ a>
```

In an effort to allow users to play content in their preferred media players, some content providers will make the content available in multiple media types or employing different attributes within a media type (e.g., different bit rates), and such content providers may prefer that playlist entries corresponding to content provided by them include pointers to at least a subset of the available forms of content. To permit such multiple pointers to be implemented according to the instant browser interpretable document, the hTrack keyword can be applied to a container element. This is illustrated below in Table 4.

TABLE 4

```
<div
    class="htrack">
    Hello, hTrack
    World! </div>
```

Given that a single playlist entry can contain multiple playable links to the content, as well as other links, the question then becomes how to distinguish playable links from other links. By way of example, without limitation, in an hTrack container having multiple links such as that illustrated below in Table 5, there is no programmatic way to distinguish between the playable link "http://example.com/mp3" and one or more links to other information, such as, without limitation, links to information about the artist and/or purchase the content to which the playable link pertains.

TABLE 5

```
<div class="htrack">
    <a href="http: //example.com/mp3">Hello, hTrack
World!</a> <a href="http://example.com/about">Lyrics to
this song</a> </div>
```

The second new keyword, "timed", facilitates distinguishing between playable links and other, related links. The timed keyword expresses the idea that this is a URL where the timed media which is the core of this track can be found. It does not imply that there is only one such URL, and the presence of more than one timed media links is acceptable. An exemplary use of such a keyword is illustrated below in Table 6, and a more complete, HTML-based example is provided in FIG. 15.

TABLE 6

```
<div class="htrack">
    <a href="http: //example.com/ogg" class="timed">Hello,
hTrack World! (Ogg Vorbis)</a>
    <a href="http: //example.com/qt" class="timed">Hello,
hTrack World! (Quicktime) </a>
    <a href="http://example.com/about">Lyrics to this
song</a> </div>
```

Some skilled in the art will appreciate that the type attribute has functionality similar to enclosure elements for feed formats, thus the instant browser interpretable document may initially be seen as similar to technology underlying podcasting. However, upon more careful examination, the differences between podcasting and the instant browser interpretable document should be apparent. By way of example, the semantics of hTrack is a series of one or more timed media elements to be rendered in a user-set order. By contrast, the enclosure element used in podcasting facilitates pre-fetching of large files, reading entries in reverse chronological order, and copying media files to a portable device.

In conjunction with a playlist, a browser interpretable document according to the instant disclosure can also include a series of instructions for determining whether an appropriate media player is available for a given content's media type. In an embodiment, such a series of instructions may be written in any programming or scripting language that facilitates calls to other applications, including languages such as, without limitation, AJAX, JAVA, JAVA Script, VB Script, C++, and the like. In an alternative embodiment, such a series of instructions may be written in any language, and may pass information to an intermediary "helper application" such as, without limitation, a browser plug-in or extension.

Where a playlist entry has a plurality of links to content (e.g., the same content at different bitrates or encoded using different media types), the instructions can also select an appropriate content link from those available based on attributes of the device on which the browser is operating. By way of example, without limitation, a playlist may include an entry for full motion video corresponding to a motion picture, and the playlist entry may include links to the video at different screen resolutions. The series of instructions can determine the device's display resolution and select from the set of links that which can most readily be rendered by the device without requiring unnecessary downloading and/or downsampling of higher resolution content.

In an embodiment, the series of instructions can also determine whether any of a plurality of standard media players are installed on the device. The series of instructions can then facilitate interaction with one or more of such media players through application programmer interfaces ("API's") for those media players. In an embodiment, the series of instructions that facilitates access to such API's is implemented as a separate module that can be readily updated, thereby permitting support for new media players and new media player versions to be easily added. Such updates can be obtained by polling a source at a regular interval (e.g., every time a browser interpretable document is loaded, once every week, every time the device restarts, etc.), or updates can be "pushed" to the device and/or browser.

An advantage of the browser interpretable document described herein is that, in addition to providing a well-structured playlist format that can be interpreted by and used across a wide variety of browsers, the browser interpretable document can also be used to define a user interface through which a plurality of media players can be controlled.

FIG. 1 is a block diagram illustrating a method through which a browser interpretable document can be used to control a plurality of media players. In Block 100 of FIG. 1, a graphical interface is created through which a plurality of media players are to be controlled. In an embodiment, such a graphical interface may be created as a single, flat image file, such as, without limitation, a JPEG-encoded image; a collection of textual elements, such as, without limitation, "<--", "<-", "Stop", "Play", "||", "->", "-->"; a collection of static and/or moving images; or combinations thereof. Collections of images and/or text can be combined into a browser interpretable document using HTML, XHTML, or other such languages to create the graphical user interface.

Figure 3:
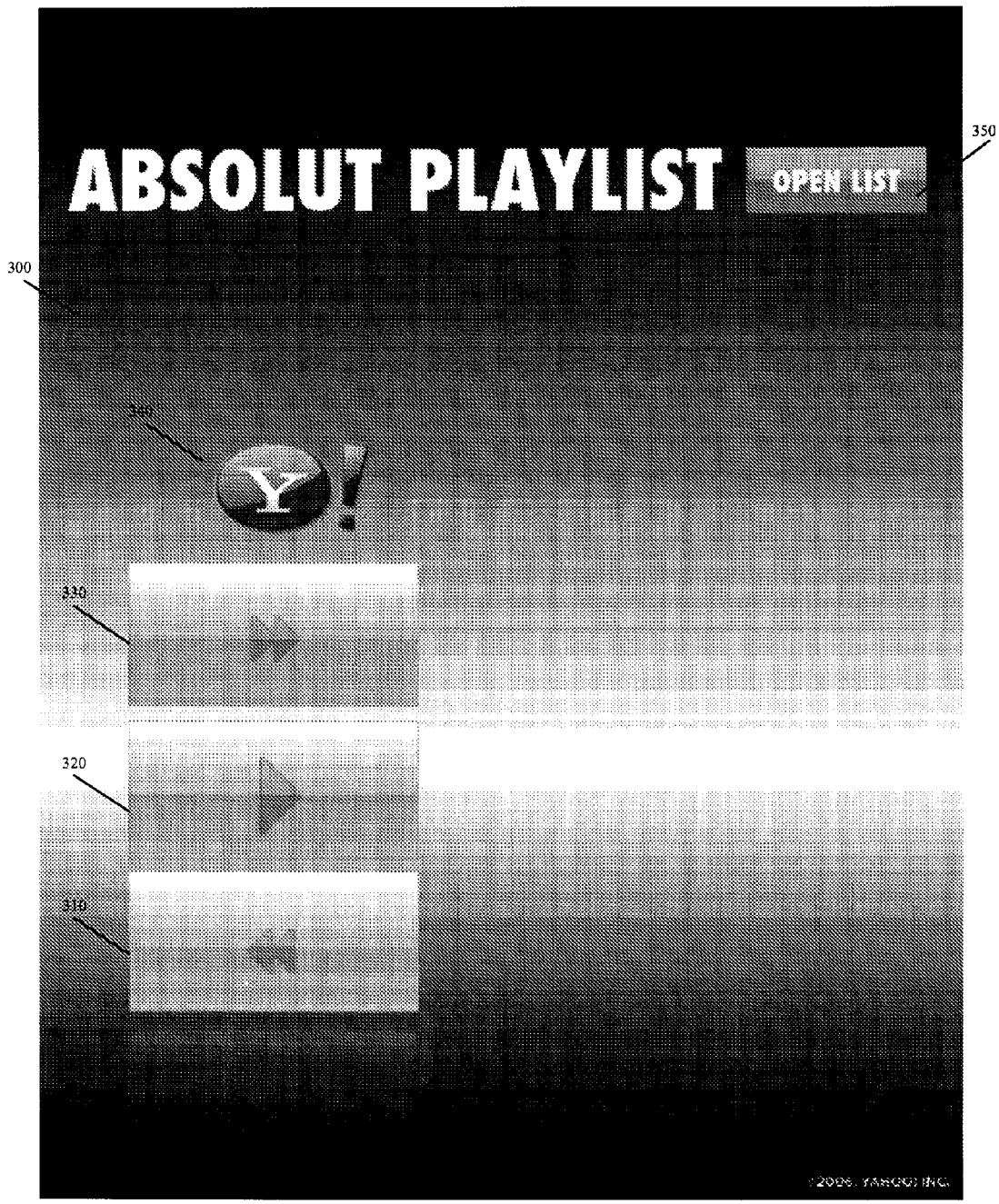
FIG. 3 is an exemplary browser interpretable document providing a user interface through which a plurality of media players can be controlled.

FIG. 3 illustrates an exemplary embodiment in which a plurality of graphical and textual elements are combined in an HTML document to create such a graphical user interface. In FIG. 3, buttons 310, 320, and 330 are intended to facilitate previous track, play/pause, and next track functionality, respectively. Button 340 provides a convenient link through which a user can access a content provider, in this case the well known Yahoo! music engine. Button 350 allows the user to view the playlist being controlled by buttons 310, 320, and 330.

In Block 110 of FIG. 1, at least one user interface element, or control, is defined. In an embodiment, the user interface element may be defined by identifying one or more regions within an image, such as, without limitation, by using the map and area elements of HTML. In an embodiment, where the graphical user interface comprises one or more HTML elements, a container element, such as, without limitation, a <div> element, may be placed around one or more HTML elements, thereby identifying such HTML elements as a user interface element.

In Block 120, at least one function is associated with the defined user interface element. User interface elements are generally created to facilitate controlling or otherwise interacting with a media player, and in this step the specific functionality associated with the user interface element is defined.

In Block 130, at least one playlist is associated with the graphical user interface. The playlist comprises at least one media file or a pointer to the media file. In an embodiment, such a playlist may be defined using the playlist specification described above, and in some embodiments, the playlist and the graphical user interface may be stored in the same file. Some embodiments may incorporate a reference to the graphical user interface into the playlist, and some embodiments may incorporate a reference to the playlist into the graphical user interface.

In Block 140, it is determined whether a media player capable of playing a media file in the playlist has been installed on the computing device on which the instant method is implemented. If no such media player has been installed, the device may be provided with a link through which an appropriate media player can be obtained (Block 150).

Once an appropriate media player has been identified and its installation status confirmed, the browser in which the instant method is implemented can cause the computing device to load the appropriate media player (Block 160). In an embodiment, the media player's native controls are hidden from the user (Block 170), and the user can utilize the controls provided by the graphical user interface to control the media player. In an embodiment, any images presented by the media player, such as, without limitations, static or dynamic images, visualizations, and the like, may be presented in a window, thereby facilitating the user's review of the same. In such an embodiment, the window may be affixed to or embedded in the graphical user interface. In an alternative embodiment, the instant method may permit the user to move the window containing the image. In Block 180, the instant method monitors the user's interactions with the user interface elements, and the commands associated with the user's interactions are sent to the loaded media player (Block 190).

Figure 2:
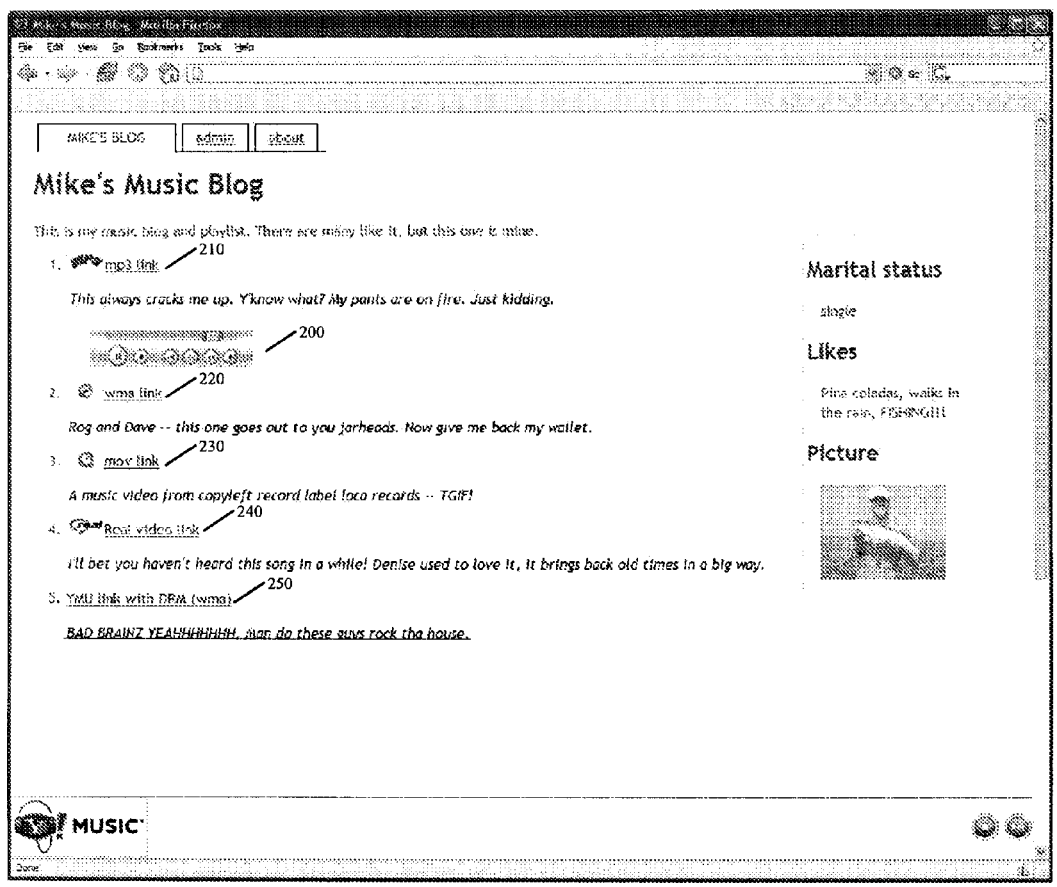
FIG. 2 is an exemplary browser interpretable document providing a playlist.

FIG. 2 is an exemplary browser interpretable document providing a playlist. In FIG. 2, controls 200 facilitate controlling playback of each of content entries 210, 220, 230, 240, and 250. Content entry 210 is a link to content encoded using the MP3 media type. Content 220 is content encoded using the WMA media type. Content 220 is encoded using the Quicktime media type. Content 240 is encoded using the RealVideo media type. Content 250 is a link to content provided by a content provider, wherein the content is encoded using the WMA media type. Traditional media players attempting to play the content represented in this list would only be able to play a subset of the content, because at least two of the media types are proprietary media types. As a result, the user would have to switch between media players to hear the represented content. The content also would not be playable in a continuous stream, as there is no communication between the media players that would facilitate playback initiation by the next media player. By contrast, by implementing a browser interpretable playlist in conjunction with the underlying series of instructions described above, user interface elements 200 can control each of the media players needed to play the content in this playlist, thereby providing a convenient, consistent user interface through which a plurality of media players can be controlled.

Figure 4:
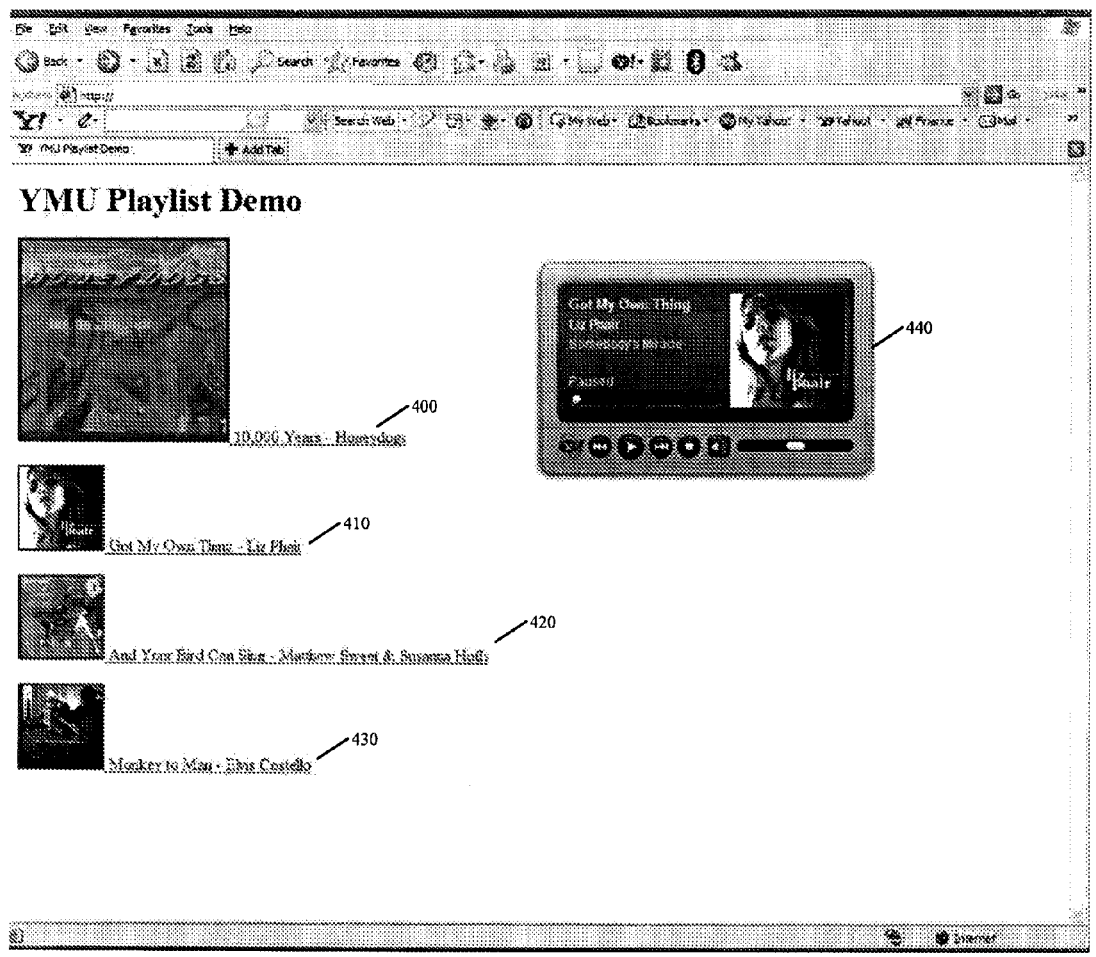
FIG. 4 is an alternative exemplary browser interpretable document providing a user interface through which a plurality of media players can be controlled.

FIG. 4 is an alternative exemplary browser interpretable document providing a user interface through which a plurality of media players can be controlled, wherein the browser interpretable document has been rendered by a browser. A text-based version of the corresponding browser interpretable file is provided in FIG. 13. In this embodiment, the playlist has been defined according to the playlist format described above. Each playlist entry 400, 410, 420, and 430 includes at least one link to the content to be played, a link to album art or other graphic to be displayed, and a description of the content. Graphical user interface 440 is a window generated by a series of instructions referenced by the <script type="text/javascript" src="http://server.yahoo.com/user/file.js"></script> instruction in FIG. 13. An exemplary set of instructions for generating such a graphical user interface and for receiving input from and interacting with a user via such an interface is included in Appendix A, which is incorporated herein by reference in its entirety. In an embodiment, such instructions can be written in Asynchronous JavaScript and XML ("AJAX") or other standardized language for producing interactive applications. The instructions can facilitate loading the graphical user interface, monitoring the user's interactions with the graphical user interface, and controlling a plurality of media players via the API's associated with the media players.

Figure 5:
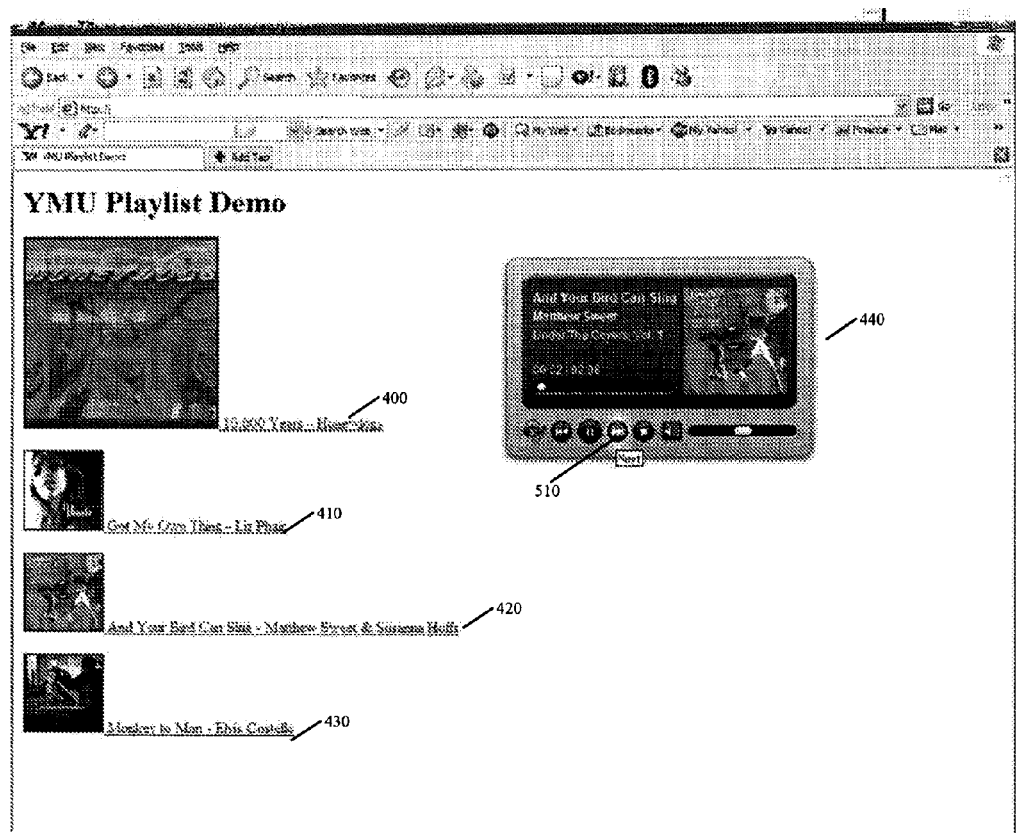
FIG. 5 is an alternative exemplary browser interpretable document which is being used to control a media player.

FIG. 5 is an alternative exemplary browser interpretable document which is being used to control a media player. In FIG. 5, the user has clicked button 510 to move from playlist entry 410 to playlist entry 420, and graphical user interface 440 has been updated to reflect the new content being played.

Figure 6:
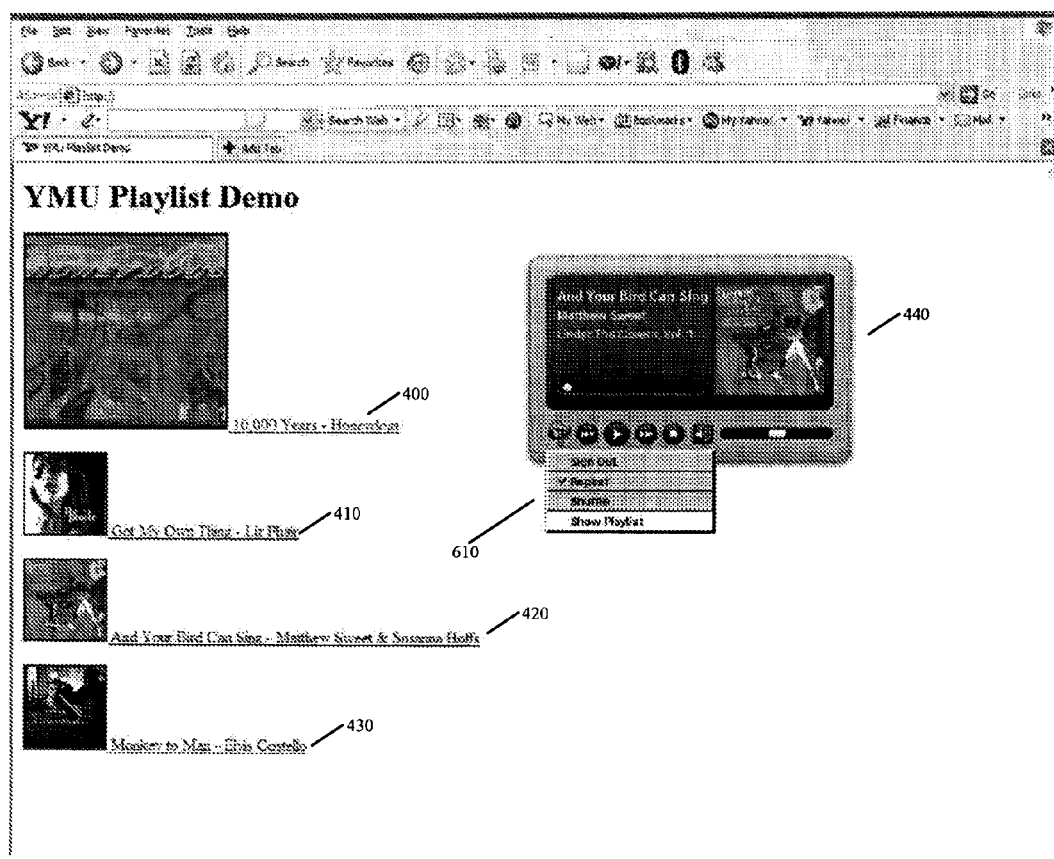
FIG. 6 is an alternative exemplary browser interpretable document which is being used to control a media player.

FIG. 6 is an alternative exemplary browser interpretable document which is being used to control a media player. In FIG. 6, the user has right-clicked on graphical user interface 440, thereby causing context-sensitive menu 610 to be displayed. In the illustrated embodiment, context-sensitive menu 610 permits the user to control various playback options, including repeating a playlist and randomly selecting from the content defined in the playlist. Context-sensitive menu 610 also allows the user to indicate a desire to view the playlist in a more streamlined interface. Such an interface is illustrated in FIG. 7.

Figure 7:
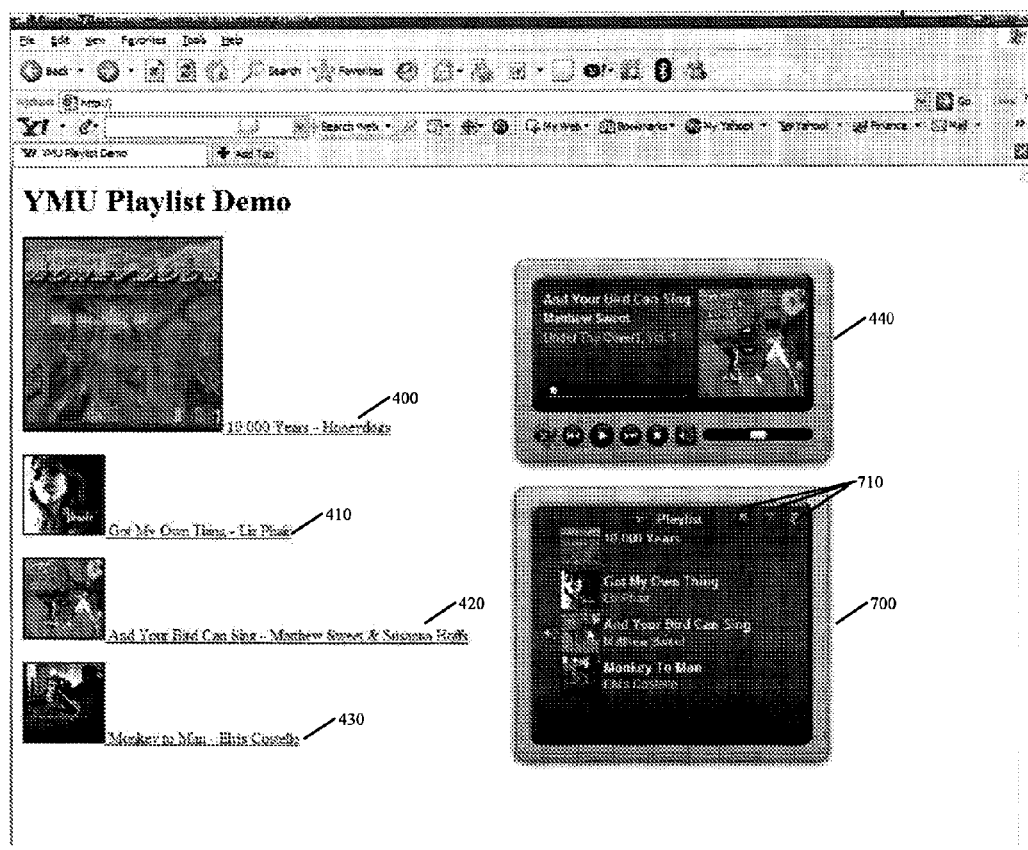
FIG. 7 is an alternative exemplary browser interpretable document, wherein the user interface provided by the browser interpretable document also provides access to a playlist.

FIG. 7 is an alternative exemplary browser interpretable document, wherein the user interface provided by the browser interpretable document also provides access to a playlist interface 700. Playlist interface 700 can display a listing of the content referenced in the playlist, and can also permit the user to exercise control over the playlist and playlist interface 700. By way of example, without limitation, playlist interface 700 can include a plurality of user interface elements 710 through which the user can save the playlist, undo edits made to the playlist, remove songs from the playlist, begin playback of specific content from the playlist, hide the playlist interface, and the like. Playlist interface 710 can also permit the user to edit the playlist, as illustrated in FIGS. 8-11.

Figure 8:
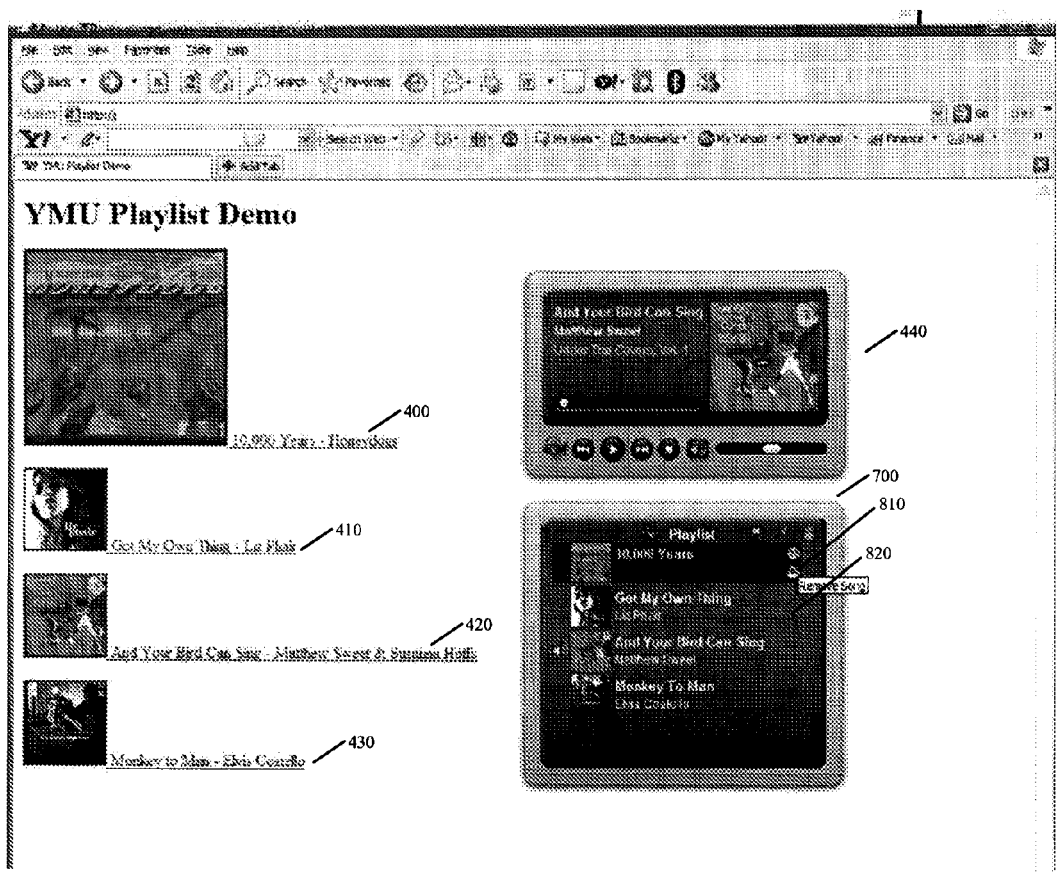
FIG. 8 is an alternative exemplary browser interpretable document, wherein the user interface provided by the browser interpretable document also provides a user interface through which a playlist can be edited.
Figure 9:
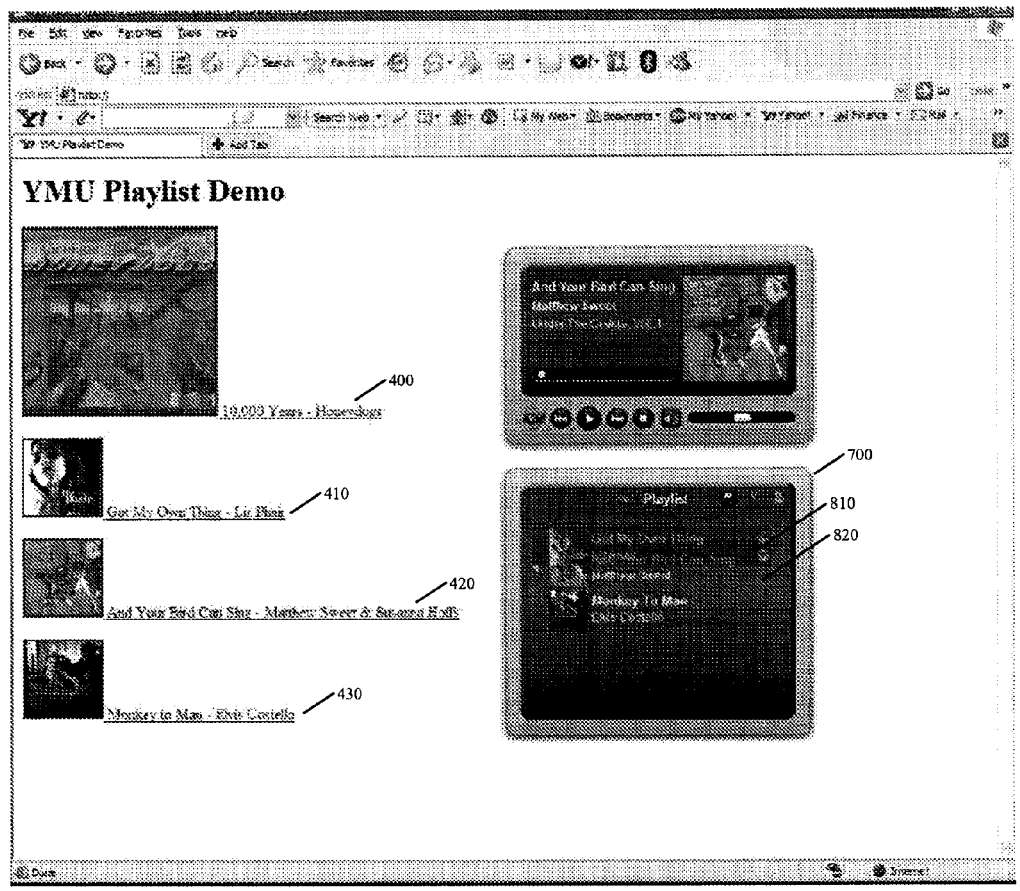
FIG. 9 is an alternative exemplary browser interpretable document, wherein the user interface provided by the browser interpretable document permits drag-and-drop reordering of playlist entries.
Figure 10:
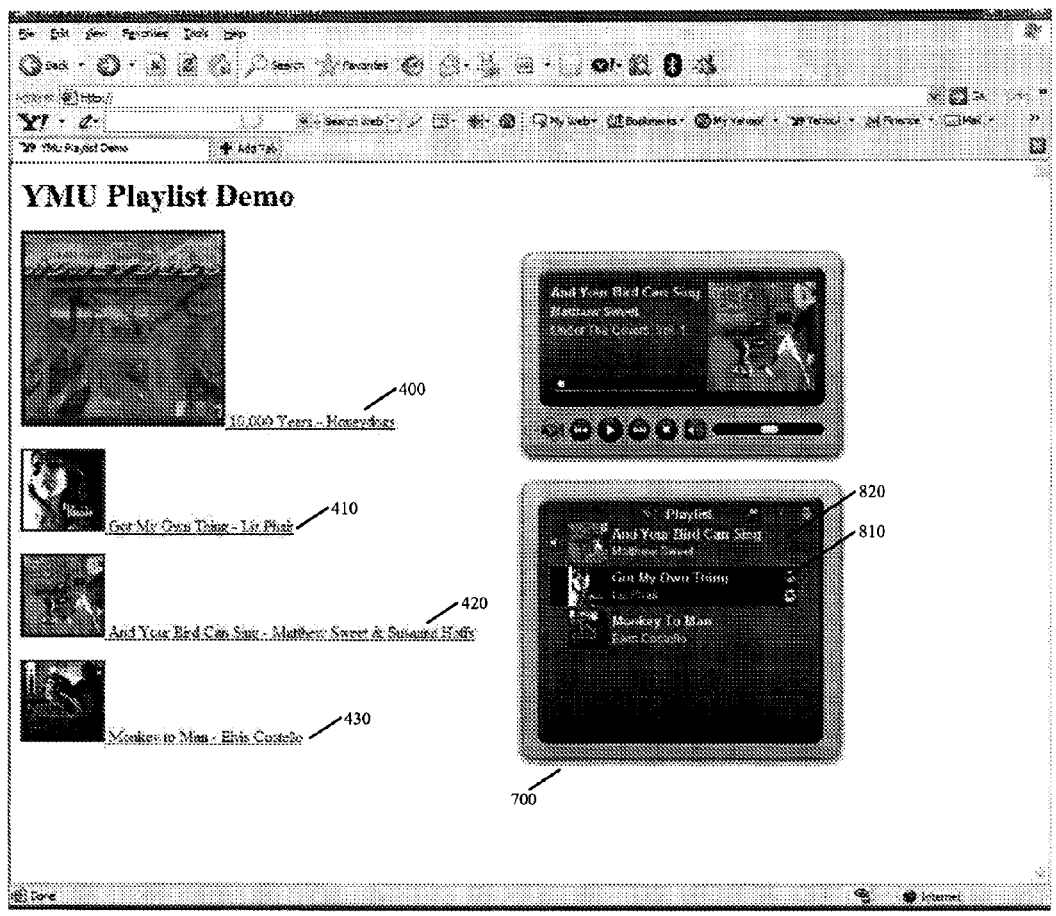
FIG. 10 is an alternative exemplary browser interpretable document, wherein the user interface provided by the browser interpretable document after the playlist entries have been reordered.

In FIG. 8, the user has clicked on or otherwise selected content entry 810. In FIG. 9, the user has begun to drag or otherwise reorder content entry 810 such that it will appear in the playlist interface after content entry 820. In FIG. 10, the user has finished reordering the content entries in playlist 700 such that content entry 810 now appears after content entry 820.

Figure 11:
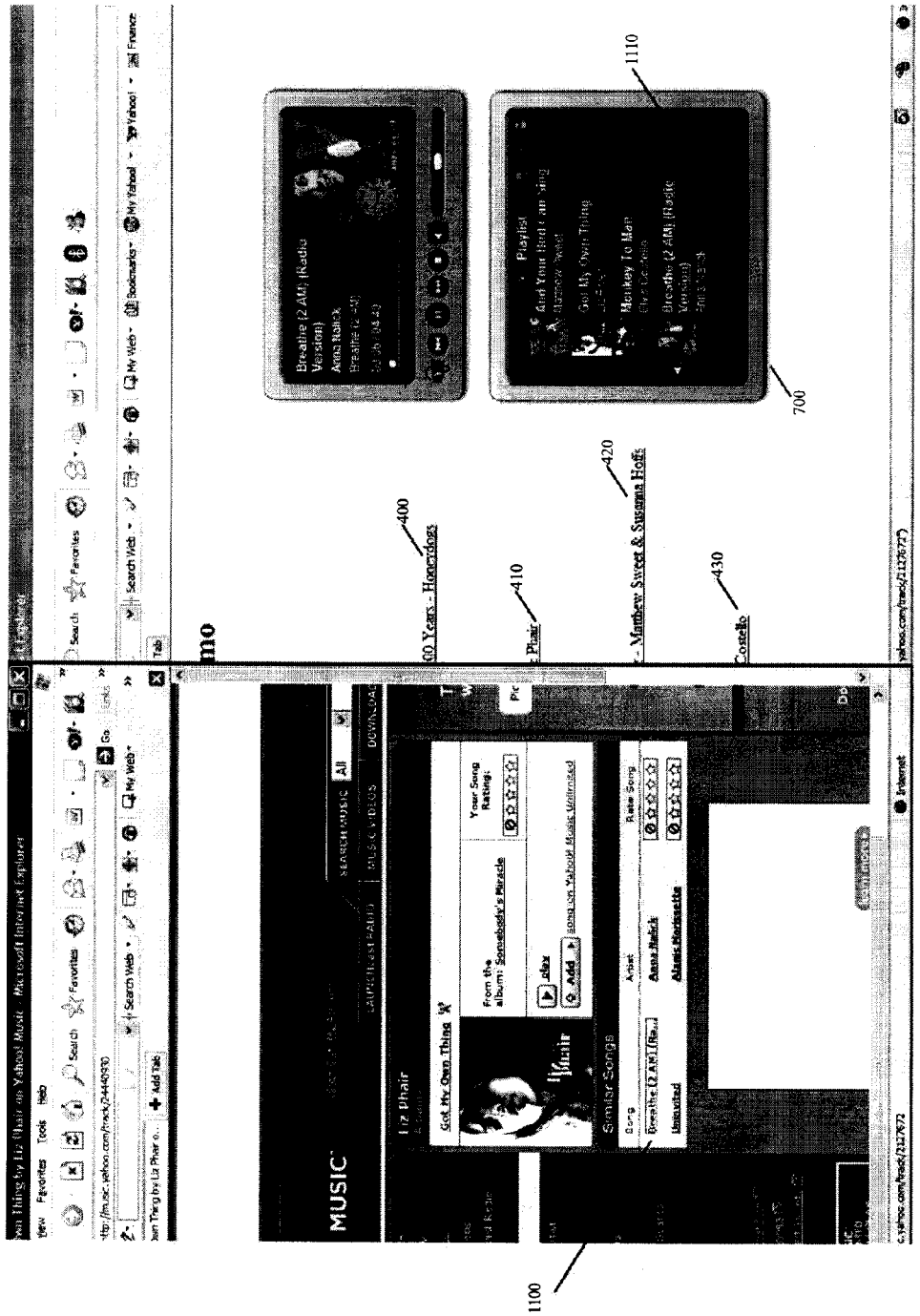
FIG. 11 is an alternative exemplary browser interpretable document, wherein a playlist entry has been added by dragging and dropping a URL to content.

FIG. 11 is an alternative exemplary browser interpretable document, wherein a playlist entry has been added by dragging and dropping a URL to content from a separate browser interface into playlist interface 700. In FIG. 11, the user clicked on or otherwise selected URL 1100, and dragged the URL into playlist interface 700. In the illustrated embodiment, playlist interface 700 was able to obtain album art and other information associated with URL 1100 based on the information contained in URL 1100. Playlist interface 700 was then updated to include a reference to the underlying content behind URL 1100. In an embodiment, playlist interface 700 can also determine whether a user has the right to access the underlying content behind URL 1100, and if not, playlist interface 700 can facilitate obtaining the necessary rights.

Figure 12:
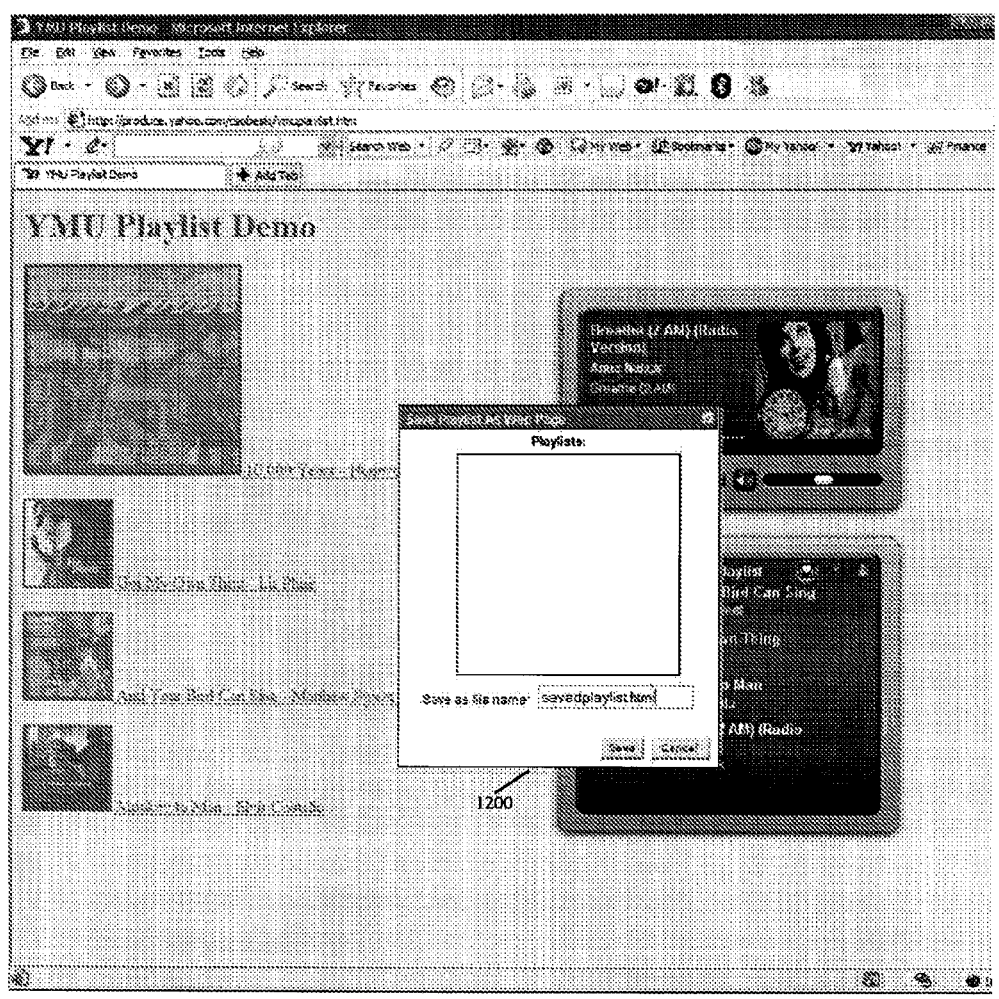
FIG. 12 is an alternative exemplary browser interpretable document which facilitates storing the playlist.

FIG. 12 is an alternative exemplary browser interpretable document which facilitates storing the playlist. As will be appreciated, when a user has altered the playlist, such as via playlist interface 700, the user may wish to save the altered playlist. In an embodiment, user interface 1200 can permit the user to save the altered playlist as a browser interpretable document.

In an embodiment, the URL to a particular content stream, or to particular content, may not be readily available. By way of example, without intending to limit the present invention, some services provide access to various forms of content by a variety of artists, as well as information about each piece of content. In such services, the publicly-available URL associated with a particular piece of content generally refers to the content by an ID number or name, such as, without limitation, 16472906. A user visiting the URL associated with the content, such as http://www.SomeServer.com/track/16472906 will typically see an information page that includes the artist's name, a description of the content, and the like, along with a button or other user interface element through which the content can be played. Although described herein as facilitating access to the entirety of the content, in alternative embodiments access may be limited to only a portion of the content.

In traditional media player environments, when the user clicks on the button or other user interface element, a media player is launched and the content is played. In such environments, the user is frequently unaware of any underlying URL's used to access the content. Because the publicly available URL to the content does not point directly to a content stream or a content file, it can be difficult for users to easily add the underlying content from such URL's to a playlist. However, in an embodiment, the browser interpretable document can include instructions for obtaining a URL to a content stream or content file corresponding to a public URL from such services. In an embodiment, the URL to the content stream or content file can be obtained by accessing information from one or more web services. Similar means can be employed when the user does not have access to particular content. By way of example, without limitation, a particular playlist may include a reference to content stored on a remote server. If that server is unavailable, the instant system can access copies available through alternative content sources. Similarly, a playlist may include a reference to content for which the user does not have appropriate permissions, and in an embodiment the instant system can determine the underlying content or content stream and attempt to locate alternative sources of the same content or content stream for the user. In an embodiment, the URL for an underlying content or content stream can be obtained by requesting appropriate information from a web service, such as, without limitation, the services provided by MusicNet, using Simple Object Access Protocol ("SOAP"), Inter-ORB Protocol (IIOP), Remote Method Invocation ("RMI"), or other such means.

Figure 16:
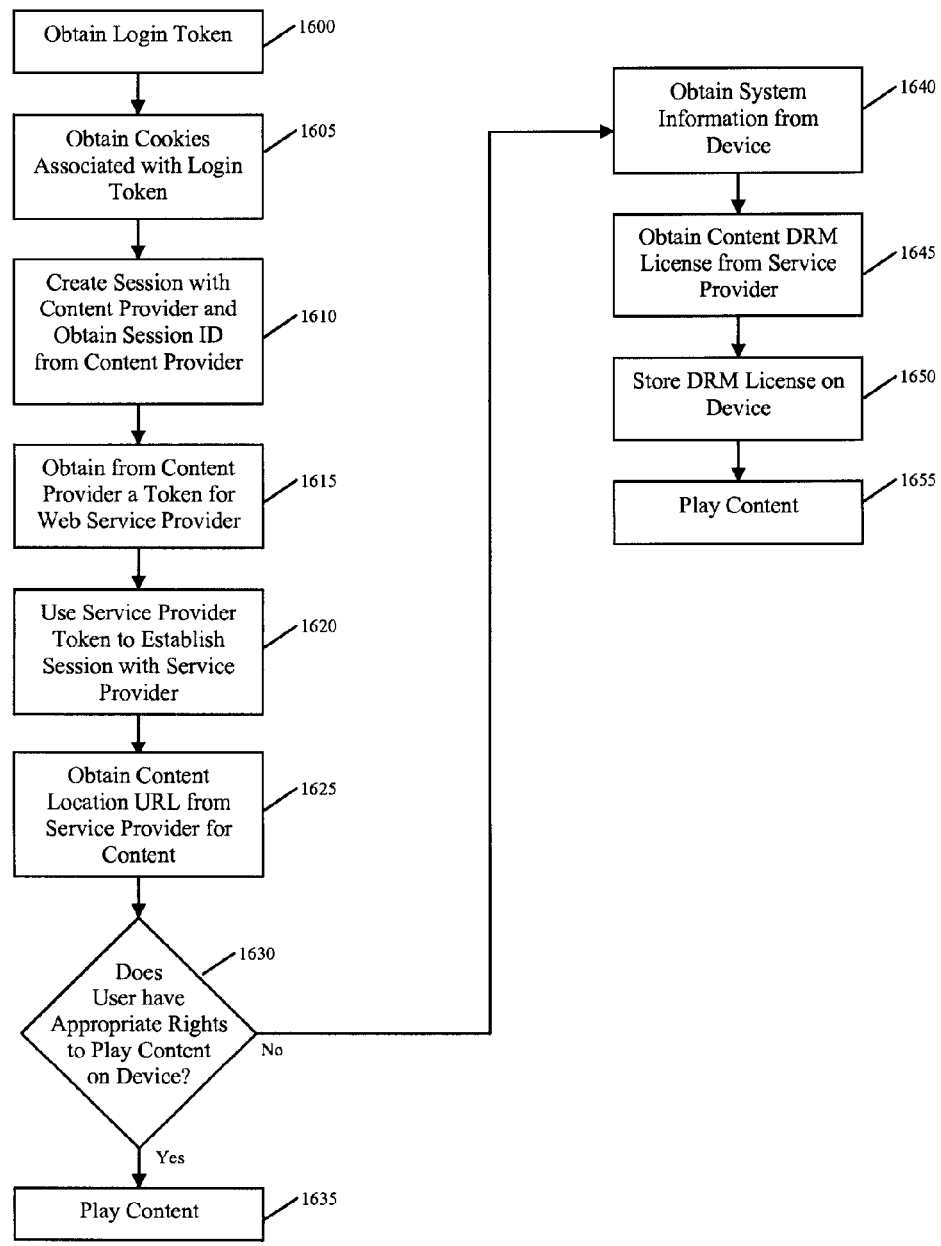
FIG. 16 is a block diagram illustrating an exemplary method through which appropriate digital rights management licensing information can be obtained.

An exemplary method for obtaining a URL to underlying content or content stream to which the user has appropriate DRM rights is illustrated in FIG. 16. In Block 1600, login information, such as a login token, is acquired through which the user can be identified to the content provider. A login token may be advantageous over a traditional username/password combination, as such a token does not require that password be transmitted. Although a login token is used in this exemplary embodiment, alternative user authentication information, including traditional username/password combinations, may be substituted therefor without departing from the spirit or the scope of the invention. "Cookies", or information about the user, the browser, and/or the device, can also be obtained from the browser (Block 1605). The login token and any required or desired cookies are passed to the content provider, and a session is created through which information can be communicated (Block 1610). In an embodiment, the session may be encrypted, thereby facilitating secure communication between the browser and the content provider.

The content provider can provide a token through which the browser can be identified as corresponding to a properly authenticated user of the content provider's system, wherein the token can be used to access information from one or more service providers (Block 1615). In the illustrated embodiment, the browser can create a session using the service provider token, through which the browser can communicate with a service provider (Block 1620). The browser and/or the content provider can supply information about the desired content, such as, without limitation, a reference number associated with the content, and the service provider can return a location URL through which the content can be accessed (Block 1625). The user's DRM rights are then queried to determine whether the user has appropriate rights to play the content (Block 1630). If the user has the appropriate DRM licensing information necessary to permit playback of the content, then the content is played (Block 1635).

If the user does not have appropriate DRM licensing information, an identifier specific to the device, browser, and/or user may be transmitted to the service provider to initiate the acquisition of such licensing information (Block 1640). In some embodiments, the content provider may act as a surrogate for some of the interactions between the user an the service provider, and the content provider and/or service provider can perform any transaction-related processes, such as, without limitation, billing the user for acquisition of the appropriate DRM rights.

In an embodiment, the service provider transfers appropriate DRM licensing information to the browser (Block 1645), and the browser stores this information (Block 1650). The DRM licensing information can be stored by the browser through a variety of means, including by using a Windows Media Player Digital Rights Management (WM-DRM) ActiveX control for the browser or other such controls. Once the URL and DRM licensing information have been obtained, the content can be played (Block 1655). In an embodiment, the URL supplied by the service provider may be a temporary URL, thereby facilitating validation and enforcement of the associated DRM licensing information each time the content is played.

Through the browser interpretable document described herein, users can easily create well-structured playlists, and play the content in those playlists through a single user interface, regardless of the media player responsible for playing the content. While detailed and specific embodiments of a browser interpretable document for controlling a plurality of media players have been described herein, it will be apparent to those skilled in the art that various changes and modifications can be made therein without departing from the spirit and scope of a browser interpretable document for controlling a plurality of media players. Thus, it is intended that the present disclosure cover these modifications and variations provided they come within the scope of any appended claims and/or their equivalents.

What is claimed is:

1. A method comprising:
defining a graphical user interface through which a plurality of media players implemented on a computing device are to be controlled, wherein the graphical user interface comprises a user interface element displayed as part of the graphical user interface;
associating at least one function with the defined user interface element;
associating at least one playlist and a plurality of entries of the at least one playlist with the graphical user interface, said association comprising identifying a type for each entry of the at least one playlist based upon attributes of the computing device on which the graphical user interface is operating, wherein each entry comprises a first media file or a pointer to the first media file;
storing the graphical user interface and the association of the playlist with the graphical user interface in a manner interpretable by a web browser; and
associating computer program process code with the graphical user interface, wherein the computer program process code comprises instructions for:
determining whether a media player capable of playing the first media file is accessible to the computing device based at least in part on said each entry of said at least one playlist associated with the graphical user interface;
causing the media player determined capable of playing the first media file to be loaded by the computing device, wherein at least native controls of the media player are hidden from a user;
monitoring for interaction with the defined user interface element; and
controlling the media player via the user interface element so as to cause the media player to function in a manner corresponding to the function associated with the user interface element.

2. The method of claim 1, wherein the graphical user interface exists independent from any media player.

3. The method of claim 1, wherein the graphical user interface comprises at least one graphics file.

4. The method of claim 1, wherein the playlist further comprises a media type indicator associated with the first media file.

5. The method of claim 4, wherein the media player capable of playing the first media file is determined, at least in part, by the media type indicator associated with the first media file.

6. The method of claim 1, further comprising storing the graphical user interface and the association of the computer program process code with the graphical user interface in a manner interpretable by a web browser.

7. The method of claim 6, wherein the graphical user interface, the association of the graphical user interface and the playlist, and the association of the graphical user interface and the computer program process code are stored in the same file.

8. A system comprising:
a defined graphical user interface visibly displayed on a display of a computing device, wherein the defined graphical user interface receives user interactions, wherein the defined graphical user interface comprises a user interface element, wherein the defined user interface element has a function associated therewith, and wherein the defined graphical user interface is stored in a markup language derived from the Standardized Generalized Markup Language and interpretable by a web browser running on the computing device, a set of instructions interpretable by the web browser implemented by the computing device, whereby the web browser can send commands to one of a plurality of loaded media players installed on the computing device, thereby permitting the web browser to control playback of a media file based on user interactions with the defined graphical user interface; and a playlist, wherein the playlist is stored in a markup language derived from the Standardized Generalized Markup Language and interpretable by the web browser implemented by the computing device, wherein the playlist comprises a plurality of entries that are associated with the defined graphical user interface during association of the playlist with the defined graphical user interface, said association comprising identifying a type for each entry of the at least one playlist based upon attributes of the computing device on which the web browser is operating, and wherein at least a subset of the plurality of entries corresponds to a multimedia file.

9. The system of claim 8, wherein the set of instructions further comprises instructions for determining whether a media player capable of playing a media file is installed on the computing device.

10. The system of claim 9, wherein each playlist entry further comprises at least one media type indicator associated with the playlist entry.

11. The system of claim 10, wherein the determination of whether a media player capable of playing the media file is installed on the computing device is based, at least in part, on the media type indicator associated with a playlist entry.

12. The system of claim 11, wherein the common markup language is Hypertext Markup Language.

13. The system of claim 8, wherein the playlist and the graphical user interface are stored using a common markup language.

14. The system of claim 13, wherein the common markup language is the eXtensible Markup Language.

* * * * *